No. 840,393. PATENTED JAN. 1, 1907.
F. R. STEWART.
PLOW HANDLE.
APPLICATION FILED MAY 2, 1906.
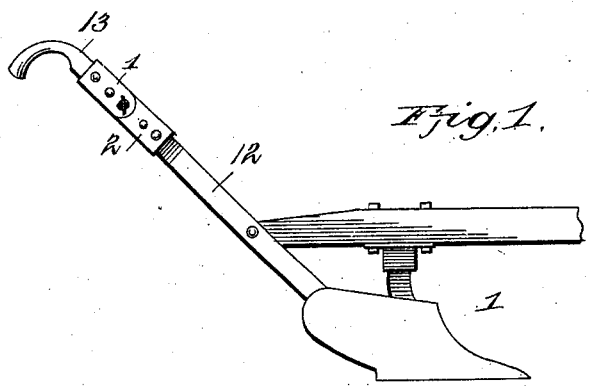
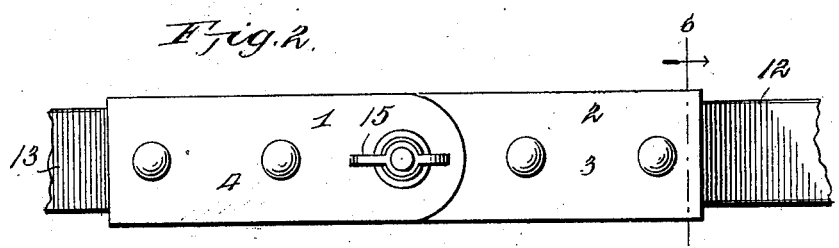
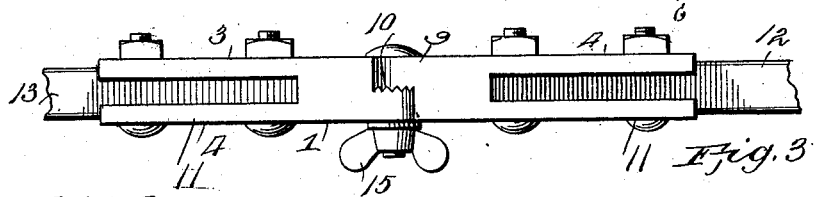
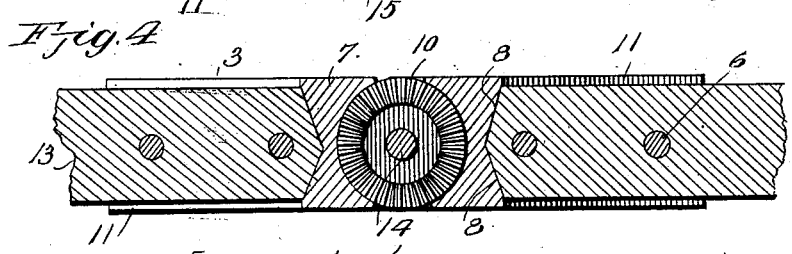
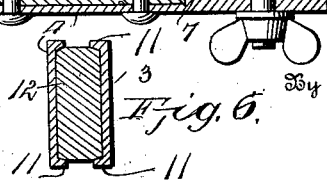
Witnesses
Frank Hough
D. W. Gould
Inventor
F. R. Stewart
By Victor J. Evans
Attorney
THE NORRIS PETERS CO., WASHINGTON, D. C.

UNITED STATES PATENT OFFICE.

FRANK R. STEWART, OF OBLONG, ILLINOIS.

PLOW-HANDLE.

No. 840,393.  Specification of Letters Patent.  Patented Jan. 1, 1907.

Application filed May 2, 1906. Serial No. 314,802.

*To all whom it may concern:*

Be it known that I, FRANK R. STEWART, a citizen of the United States, residing at Oblong, in the county of Crawford and State of Illinois, have invented new and useful Improvements in Plow-Handles, of which the following is a specification.

The invention relates to an improvement in plows or similar implements, and particularly to a means whereby the handles proper of such implements may be adjusted with relation to the handle-bars.

The main object of the invention is the production of an adjusting-coupler for connecting the handle proper and handle-bars of a plow or similar implement, the construction providing for securing the handles proper at desired heights relative to the working plane of the implement, whereby to accommodate the implement to the use of operators of different heights.

The invention will be described in the following specification, reference being had particularly to the accompanying drawings, in which—

Figure 1 is a view in side elevation showing a plow provided with my improved adjusting-coupler. Fig. 2 is an enlarged side elevation of the coupler, a portion of the handle and handle-bar being shown in place. Fig. 3 is a top plan of the same; Fig. 4, a vertical central section of the same; Fig. 5, a transverse central section of the same, and Fig. 6 a section on line 6 6 of Fig. 2.

Referring to the drawings, my improved adjustable coupling is shown in use with a plow, though it is to be understood that it is equally applicable to cultivators or similar implements.

The coupling proper comprises a handle member 1 and a bar member 2, said members being of identical construction and designed for fixed connection to the handle-bar and handle proper, as shown. Each of the members comprises spaced parallel plates 3 and 4, which may be of any desired length and formed with transversely-alined openings 5 for the reception of securing-bolts 6. At the connecting end of the member the side plates 3 and 4 are joined by a transverse wall 7, forming, with the plates 3 and 4, a socket for the reception of the handle-bar or handle proper. The inner surface of the wall 7, against which the end of the bar or handle bears, is preferably of angular contour in vertical section—that is, the plane of said surface inclines from the respective upper and lower ends thereof forwardly toward the center, forming inclines 8 in the face of said wall, which are of the full width of the wall and form an angular pocket for the reception of the bar or handle.

Projecting from the forward end of each of the respective members is a disk 9, the outer surface of which is in alinement with the surface of one of the plates, as 4, while the inner surface is in practical alinement with the longitudinal center of the member, so that said disk is wholly offset beyond the longitudinal center of one member, with one side thereof in a plane with one side of the member. The disk is formed on its inner face with an annular series of serrations or teeth 10, preferably projecting beyond the plane of the face. By preference the upper and lower edges of the side plates 3 and 4 of each member are formed with inwardly-turned flanges 11, serving to bear upon the upper and lower surfaces of the handle-bar or handle and aid in securing the parts against independent movement.

In use the ordinary handle-bar of the implement is divided to provide what I term the "handle-bar" section 12 and the handle 13. The members 1 and 2 are secured to the ends of these respective sections, the end of the sections being shaped to fit the incline 8 at the forward end of the transverse walls. The bolts 6 are passed through the respective plates and the sections to secure the coupling members in place, it being understood that said members are arranged on the respective sections, so as to offset the disks 9 of each in opposite directions from the longitudinal center of the member. By this arrangement said disks are adapted to be secured together through the medium of a bolt 14, passed centrally through the disks and provided beyond the surface of one of the disks with a thumb-nut 15, the teeth 10 of the respective disks of course intermeshing. As thus arranged the handle 13 may be adjusted at any desired height relative to the operative plane of the implement by loosening the thumb-nut 15 and moving said handle to the desired position, a tightening of the thumb-nut causing an intermeshing of the teeth 10 of the respective disks to lock the coupling member, and thereby the respective sections 12 and 13, in the desired relation. The incline 8 of the end wall of the members and the edge flanges 11 of the side plates thereof effectively reinforce the bolts 6 in maintaining a fixed relation between the coupling member and the respective section, so that when adjusted the parts are practically a single member.

While preferring that the coupling members be of the form illustrated, it is obvious that the ends receiving the respective sections 12 and 13 may, if desired, be in the form of hollow sections having side, top, and bottom walls.

In the use of the coupling-adjuster the handle proper, 13, is capable of movement to varying heights with respect to the operative plane of the implement, thereby accommodating the implement to the use of operators of different heights.

Having thus described the invention, what is claimed as new is—

1. A coupling-adjuster for plows or similar implements comprising duplicate members adapted to be secured respectively to the end of the handle-bar and to the handle proper, each of said members comprising spaced walls and a forwardly-projecting disk arranged at one side of the longitudinal center of the member, said disk being formed with a circumferential row of teeth, and means connecting the respective disks.

2. A coupling-adjuster for plows or similar implements comprising duplicate members arranged to be secured respectively to the handle-bar and to the handle proper, each of said members comprising spaced plates connected at their forward ends by a transverse wall, the bearing-surface of the wall being formed with a double incline, and a disk projecting from the end of the member and offset from the longitudinal center thereof, said disk being formed with an annular row of teeth, and means for connecting the respective disks.

In testimony whereof I affix my signature in presence of two witnesses.

FRANK R. STEWART.

Witnesses:
KATHRYN J. STEWART,
MECIE SHIRE.